(12) United States Patent
Titterton

(10) Patent No.: US 6,178,787 B1
(45) Date of Patent: Jan. 30, 2001

(54) MOTORCYCLE WHEEL DISK LOCK REMINDER SYSTEM

(76) Inventor: Lee Titterton, 115 ST. Albans Road, Seven Kings, Ilford Essex 193 8NW (GB)

( * ) Notice: Under 35 U.S.C. 154(b), the term of this patent shall be extended for 0 days.

(21) Appl. No.: 09/339,776

(22) Filed: Jun. 24, 1999

(51) Int. Cl.[7] .................................................. E05B 67/36
(52) U.S. Cl. .................................. 70/33; 70/233; 70/455; 70/424
(58) Field of Search .................................. 70/32, 33, 34, 70/233, 454, 455, 423, 424, 427, 428

(56) References Cited

U.S. PATENT DOCUMENTS

| D. 290,245 | * | 6/1987 | Opitz | D12/126 |
|---|---|---|---|---|
| D. 326,045 | * | 5/1992 | Barrett | D8/346 |
| 1,590,981 | * | 6/1926 | Lockyer | 70/237 |
| 3,564,744 | * | 2/1971 | Shock | 70/455 |
| 4,118,962 | * | 10/1978 | Block et al. | 70/455 |
| 4,297,863 | * | 11/1981 | Glock | 70/395 |
| 4,665,728 | * | 5/1987 | Azzara | 70/427 |
| 4,838,059 | * | 6/1989 | Johnson | 70/209 |
| 5,205,144 | * | 4/1993 | Montano | 70/455 |
| 5,265,451 | * | 11/1993 | Phifer | 70/226 |
| 5,442,941 | * | 8/1995 | Kahonen et al. | 70/34 |
| 5,563,387 | * | 10/1996 | Myers et al. | 200/43.03 |
| 5,746,078 | * | 5/1998 | Kiernan | 70/424 |

* cited by examiner

Primary Examiner—Lynne H. Browne
Assistant Examiner—John B. Walsh

(57) ABSTRACT

A motorcycle wheel disk lock reminder system for reminding a user that a disk lock is mounted to the wheel of the user's motorcycle so that the user does not drive the motorcycle with the disk lock attached to the wheel. The motorcycle wheel disk lock reminder system includes a disk lock adapted for attachment to a wheel of a motorcycle. The disk lock has a slot therein into which an insertion tab outwardly extending from an inner face of a reminder unit is removably inserted. The insertion tab of the reminder unit is also insertable into an ignition keyhole of the motorcycle subsequent removable of the insertion tab from the slot of the disk lock to prevent insertion of an ignition key into the ignition keyhole without prior removal therefrom of the insertion tab of the reminder unit.

3 Claims, 3 Drawing Sheets

MOTORCYCLE WHEEL DISK LOCK REMINDER SYSTEM

BACKGROUND OF THE INVENTION

1. Field of the Invention

The present invention relates to motorcycle wheel disk lock reminder systems and more particularly pertains to a new motorcycle wheel disk lock reminder system for reminding a user that a disk lock is mounted to the wheel of the user's motorcycle so that the user does not drive the motorcycle with the disk lock attached to the wheel.

2. Description of the Prior Art

The use of motorcycle wheel disk lock reminder systems is known in the prior art. More specifically, motorcycle wheel disk lock reminder systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,665,728; U.S. Pat. No. 5,563,387; U.S. Pat. No. Des. 270,245; U.S. Pat. No. Des. 326,045; U.S. Pat. No. 4,838,059; and U.S. Pat. No. 1,590,981.

While these devices fulfill their respective, particular objectives and requirements, the aforementioned patents do not disclose a new motorcycle wheel disk lock reminder system. The inventive device includes a disk lock adapted for attachment to a wheel of a motorcycle. The disk lock has a slot therein into which an insertion tab outwardly extending from an inner face of a reminder unit is removably inserted. The insertion tab of the reminder unit is also insertable into an ignition keyhole of the motorcycle subsequent removable of the insertion tab from the slot of the disk lock to prevent insertion of an ignition key into the ignition keyhole without prior removal therefrom of the insertion tab of the reminder unit.

In these respects, the motorcycle wheel disk lock reminder system according to the present invention substantially departs from the conventional concepts and designs of the prior art, and in so doing provides an apparatus primarily developed for the purpose of reminding a user that a disk lock is mounted to the wheel of the user's motorcycle so that the user does not drive the motorcycle with the disk lock attached to the wheel.

SUMMARY OF THE INVENTION

In view of the foregoing disadvantages inherent in the known types of motorcycle wheel disk lock reminder systems now present in the prior art, the present invention provides a new motorcycle wheel disk lock reminder system construction wherein the same can be utilized for reminding a user that a disk lock is mounted to the wheel of the user's motorcycle so that the user does not drive the motorcycle with the disk lock attached to the wheel.

The general purpose of the present invention, which will be described subsequently in greater detail, is to provide a new motorcycle wheel disk lock reminder system apparatus and method which has many of the advantages of the motorcycle wheel disk lock reminder systems mentioned heretofore and many novel features that result in a new motorcycle wheel disk lock reminder system which is not anticipated, rendered obvious, suggested, or even implied by any of the prior art motorcycle wheel disk lock reminder systems, either alone or in any combination thereof.

To attain this, the present invention generally comprises a disk lock adapted for attachment to a wheel of a motorcycle. The disk lock has a slot therein into which an insertion tab outwardly extending from an inner face of a reminder unit is removably inserted. The insertion tab of the reminder unit is also insertable into an ignition keyhole of the motorcycle subsequent removable of the insertion tab from the slot of the disk lock to prevent insertion of an ignition key into the ignition keyhole without prior removal therefrom of the insertion tab of the reminder unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorcycle wheel disk lock reminder system apparatus and method which has many of the advantages of the motorcycle wheel disk lock reminder systems mentioned heretofore and many novel features that result in a new motorcycle wheel disk lock reminder system which is not anticipated, rendered obvious, suggested, or even implied by any of the prior art motorcycle wheel disk lock reminder systems, either alone or in any combination thereof.

It is another object of the present invention to provide a new motorcycle wheel disk lock reminder system which may be easily and efficiently manufactured and marketed.

It is a further object of the present invention to provide a new motorcycle wheel disk lock reminder system which is of a durable and reliable construction.

An even further object of the present invention is to provide a new motorcycle wheel disk lock reminder system which is susceptible of a low cost of manufacture with regard to both materials and labor, and which accordingly is then susceptible of low prices of sale to the consuming public, thereby making such motorcycle wheel disk lock reminder system economically available to the buying public.

Still yet another object of the present invention is to provide a new motorcycle wheel disk lock reminder system which provides in the apparatuses and methods of the prior art some of the advantages thereof, while simultaneously overcoming some of the disadvantages normally associated therewith.

Still another object of the present invention is to provide a new motorcycle wheel disk lock reminder system for reminding a user that a disk lock is mounted to the wheel of the user's motorcycle so that the user does not drive the motorcycle with the disk lock attached to the wheel.

Yet another object of the present invention is to provide a new motorcycle wheel disk lock reminder system which includes a disk lock adapted for attachment to a wheel of a motorcycle. The disk lock has a slot therein into which an insertion tab outwardly extending from an inner face of a reminder unit is removably inserted. The insertion tab of the reminder unit is also insertable into an ignition keyhole of the motorcycle subsequent removable of the insertion tab from the slot of the disk lock to prevent insertion of an ignition key into the ignition keyhole without prior removal therefrom of the insertion tab of the reminder unit.

Still yet another object of the present invention is to provide a new motorcycle wheel disk lock reminder system that helps prevent injuries to motorcycles and their riders from riders who drive their motorcycles after forgetting to remove a disk lock from a wheel of their motorcycle.

Even still another object of the present invention is to provide a new motorcycle wheel disk lock reminder system that provides a quick visual reminder and also prevents a user from starting the motorcycle without first being reminded that a disk lock is attached to a wheel of the motorcycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
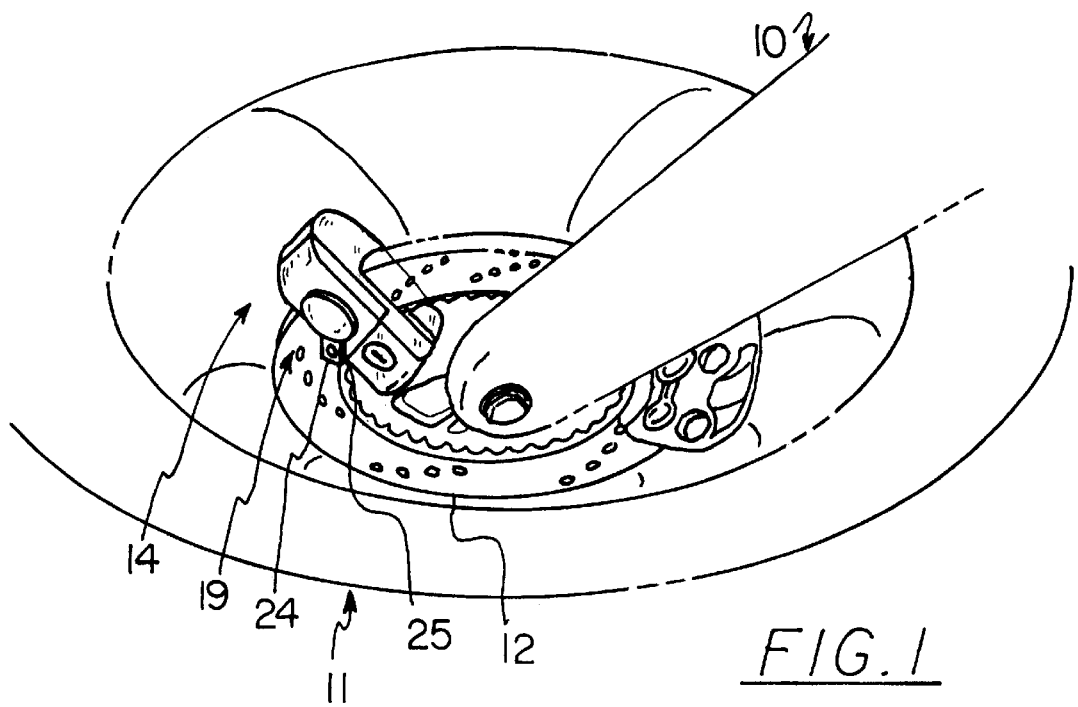
FIG. 1 is a schematic perspective view of a disk lock mounted to the wheel of a motorcycle with the insertion tab of the reminder unit inserted into the slot of the disk lock.
Figure 2:
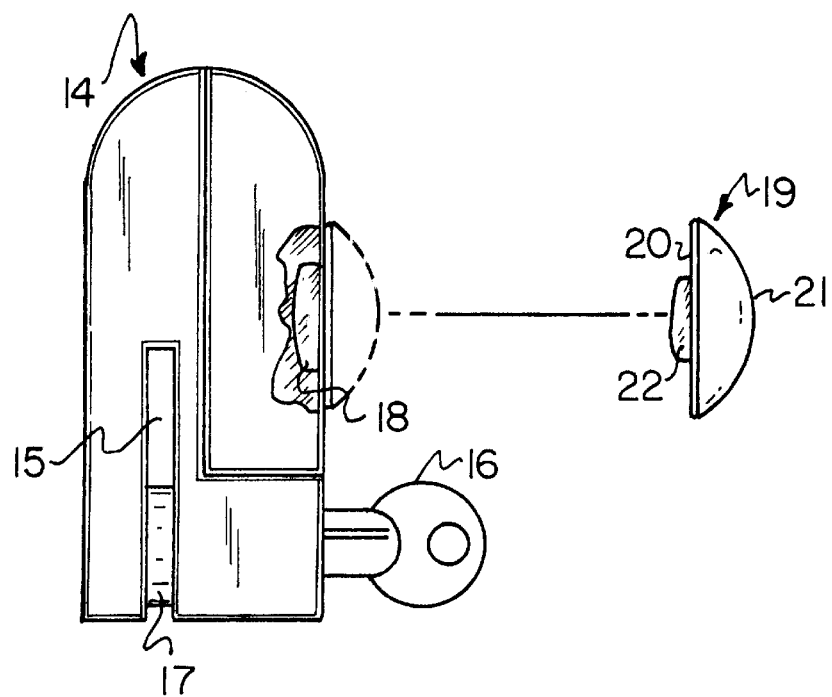
FIG. 2 is a schematic exploded breakaway side view of the disk lock and reminder unit.
Figure 3:
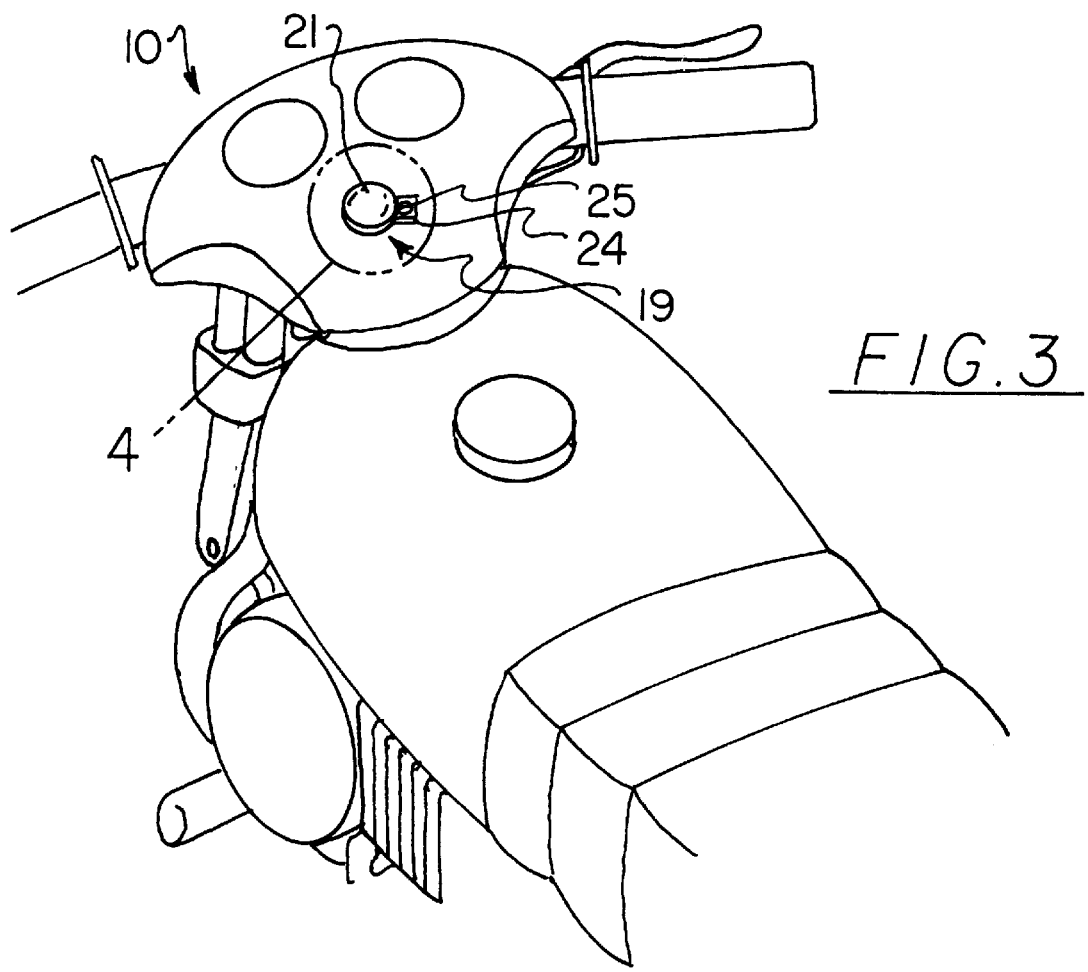
FIG. 3 is a schematic perspective view of the insertion tab of the reminder unit insertion into the ignition keyhole of the motorcycle.
Figure 4:
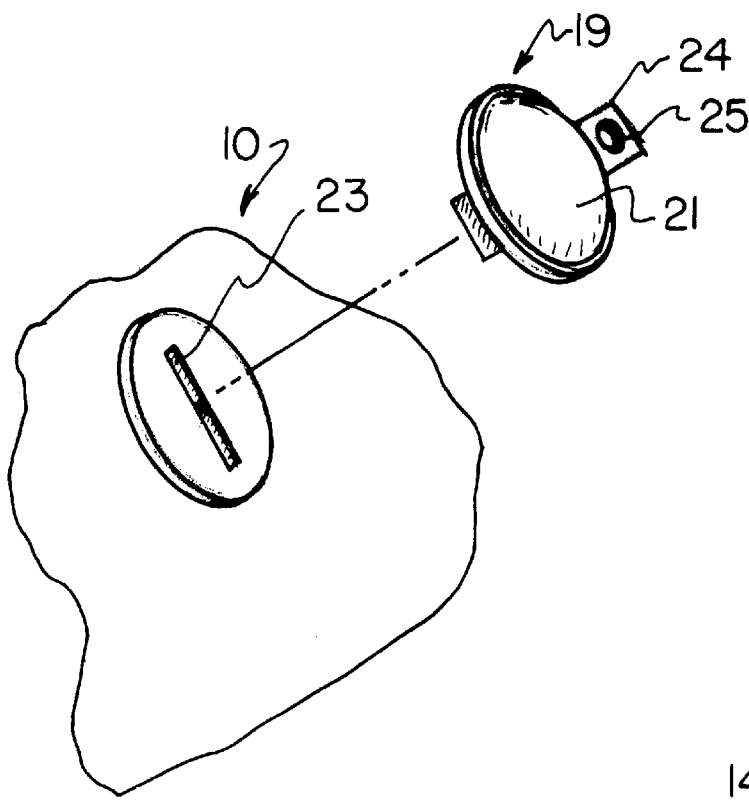
FIG. 4 is a schematic exploded enlarged view of the reminder unit removed from the ignition keyhole taken from the circle 4 of FIG. 3.
Figure 5:
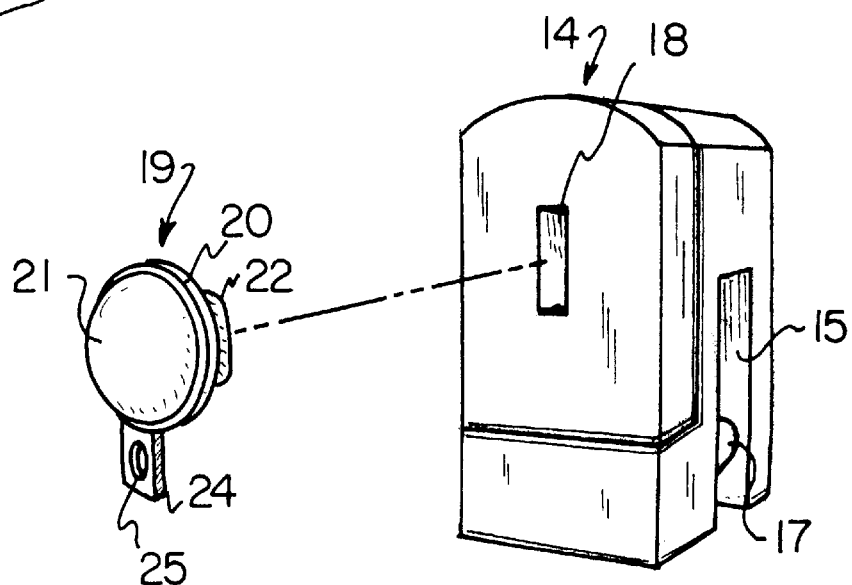
FIG. 5 is a schematic exploded perspective view of the reminder unit and the disk lock.

With reference now to the drawings, and in particular to FIGS. 1 through 5 thereof, a new motorcycle wheel disk lock reminder system embodying the principles and concepts of the present invention will be described.

As best illustrated in FIGS. 1 through 5, the motorcycle wheel disk lock reminder system generally comprises a disk lock adapted for attachment to a wheel of a motorcycle. The disk lock has a slot therein into which an insertion tab outwardly extending from an inner face of a reminder unit is removably inserted. The insertion tab of the reminder unit is also insertable into an ignition keyhole of the motorcycle subsequent removable of the insertion tab from the slot of the disk lock to prevent insertion of an ignition key into the ignition keyhole without prior removal therefrom of the insertion tab of the reminder unit.

In closer detail, the motorcycle wheel disk lock reminder system is designed for a motorcycle 10 having at least one ground engaging wheel 11 typically with an annular brake disk 12 mounted thereto, and an ignition keyhole 13 for receiving therein an ignition key for actuating the motorcycle.

A disk lock 14 is attached to the brake disk of the wheel of the motorcycle to inhibit free rotation of the wheel of the motorcycle by unauthorized riders. The disk lock has a locking channel 15 receiving the brake disk therein and a key 16 actuated lock with a lock bolt 17 retractably extending across the locking channel to releasably attaching the disk lock to the wheel of the motorcycle. The disk lock also has an outwardly facing slot 18 therein.

A reminder unit 19 is provided having a preferably generally circular substantially planar inner face 20 and a preferably generally dome-shaped arcuate outer face 21. The inner face of the reminder unit has an outwardly extending insertion tab 22.

The insertion tab of the reminder unit is inserted into the ignition keyhole 23 of the motorcycle to prevent insertion of an ignition key into the ignition keyhole without prior removal therefrom of the insertion tab of the reminder unit. The insertion tab of the reminder unit is also insertable into the slot of the disk lock to attach the reminder unit to the disk lock subsequent removal of the insertion tab from the ignition keyhole.

The inner face of the reminder unit ideally comprises a magnetic material for magnetically attaching the inner face to the ignition keyhole and the slot of the disk lock when the insertion tab is insertion into the ignition keyhole and the slot respectively.

In a preferred embodiment, the reminder unit also has a generally rectangular side tab 24 outwardly extending from an outer perimeter of the inner face of the reminder unit. Ideally, the side tab generally lies in a common plane with the inner face of the reminder unit. The side tab of the reminder unit has a generally circular hole 25 therethrough designed for extending a flexible elongate element such as a string, cord, strap or small chain therethrough to permit attachment of the reminder unit to an object such as for example a user's belt loop or key chain, with the flexible elongate element.

In use, the system is designed for reminding a user that a disk lock is mounted to a wheel of a motorcycle. Initially, the disk lock is attached to the brake disk of the wheel of the motorcycle. Next, the insertion tab of sad reminder unit is removed from the slot of the disk lock and then inserted the insertion tab of the reminder unit into the ignition keyhole of the motorcycle to thereby prevent insertion of an ignition key into the ignition keyhole without prior removal therefrom of the insertion tab of the reminder unit.

When a user is ready to ride the motorcycle, the user removes the insertion tab of the reminder unit from the ignition keyhole and then reinsert the insertion tab of the reminder unit into the slot of the disk lock to attach the reminder unit to the disk lock. The disk lock is also removed at this point from the wheel of the motorcycle. An ignition key may now be inserted into the ignition keyhole to actuate the motorcycle and so that the user can safely ride the motorcycle unhindered by the disk lock.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle wheel disk lock reminder system for use on a motorcycle having at least one ground engaging wheel, a brake disc, and an ignition keyhole for receiving therein an ignition key for actuating said motorcycle, the system comprising:

a disk lock being adapted for attachment to a wheel of a motorcycle to inhibit free rotation of said wheel of said motorcycle by unauthorized riders, said disk lock having a locking channel for receiving the brake disk therein and a key actuated lock with a lock bolt retractably extending across said locking channel for releasably attaching said disk lock to said wheel of said motorcycle;

said disk lock having a slot therein;

a reminder unit having inner and outer faces;

said inner face of said reminder unit having an outwardly extending insertion tab;

said insertion tab of said reminder unit being removably inserted into said slot of said disk lock;

said insertion tab of said reminder unit being insertable into an ignition keyhole of the motorcycle subsequent removal of said insertion tab from said slot of said disk lock to prevent insertion of an ignition key into the ignition keyhole of the motorcycle without prior removal therefrom of said insertion tab of said reminder unit;

said inner face of said reminder unit comprising a magnetic material for magnetically attaching said inner face to said ignition keyhole of said motorcycle and said slot of said disk lock when said insertion tab is inserted into said ignition keyhole and said slot respectively;

said reminder unit having a side tab outwardly extending from an outer perimeter of said inner face of said reminder unit, said side tab generally lying in a common plane with said inner face of said reminder unit; and said side tab of said reminder unit having a hole therethrough adapted for extending a flexible elongate element therethrough to permit attachment of said reminder unit to an object with said flexible elongate element.

2. A motorcycle wheel disk lock reminder system, comprising:

a motorcycle having at least one ground engaging wheel, and an ignition keyhole for receiving therein an ignition key for actuating said motorcycle;

a disk lock being attached to said wheel of said motorcycle to inhibit free rotation of said wheel of said motorcycle by unauthorized riders, said disk lock having a locking channel receiving a brake disk therein and a key actuated lock with a lock bolt retractably extending across said locking channel for releasably attaching said disk lock to said wheel of said motorcycle;

said disk lock having an outwardly facing slot therein;

a reminder unit having a generally circular substantially planar inner face and a generally dome-shaped arcuate outer face;

said inner face of said reminder unit having an outwardly extending insertion tab;

said insertion tab of said reminder unit being inserted into said ignition keyhole of said motorcycle to prevent insertion of an ignition key into said ignition keyhole of said motorcycle without prior removal therefrom of said insertion tab of said reminder unit;

said insertion tab of said reminder unit being insertable into said slot of said disk lock to attach said reminder unit to said disk lock subsequent removal of said insertion tab from said ignition keyhole;

said inner face of said reminder unit comprising a magnetic material for magnetically attaching said inner face to said ignition keyhole of said motorcycle and said slot of said disk lock when said insertion tab is inserted into said ignition keyhole and said slot respectively;

said reminder unit having a generally rectangular side tab outwardly extending from an outer perimeter of said inner face of said reminder unit, said side tab generally lying in a common plane with said inner face of said reminder unit; and said side tab of said reminder unit having a generally circular hole therethrough adapted for extending a flexible elongate element therethrough to permit attachment of said reminder unit to an object with said flexible elongate element.

3. A method for reminding a user that a disk lock is mounted to a wheel of a motorcycle, comprising the acts of:

providing a motorcycle having at least one ground engaging wheel and an ignition keyhole for receiving therein an ignition key for actuating said motorcycle;

providing a disk lock having an outwardly facing slot therein and a reminder unit, said reminder unit having an inner face, said inner face of said reminder unit having an outwardly extending insertion tab, said insertion tab of said reminder unit being inserted into said slot of said disk lock to attach said reminder unit to said disk lock;

attaching said disk lock to the wheel of the motorcycle;

removing said insertion tab of said reminder unit from said slot of said disk lock;

inserting said insertion tab of said reminder unit into said ignition keyhole of said motorcycle to thereby prevent insertion of an ignition key into said ignition keyhole without prior removal therefrom of said insertion tab of said reminder unit;

removing said insertion tab of said reminder unit from said ignition keyhole;

reinserting said insertion tab of said reminder unit into said slot of said disk lock to attach said reminder unit to said disk lock subsequent removal of said insertion tab from said ignition keyhole; and removing said disk lock from said wheel of said motorcycle.

* * * * *